United States Patent
Takagi et al.

(10) Patent No.: US 8,608,572 B1
(45) Date of Patent: Dec. 17, 2013

(54) GAME PROCESSING SERVER APPARATUS AND GAME PROCESSING SERVER SYSTEM

(71) Applicant: DeNA Co., Ltd., Tokyo (JP)

(72) Inventors: Yuzo Takagi, Tokyo (JP); Takehiro Kusano, Tokyo (JP); Satoshi Sekiguchi, Tokyo (JP); Wataru Takahashi, Tokyo (JP); Yuuki Abe, Tokyo (JP); Minehiro Nagata, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/727,934

(22) Filed: Dec. 27, 2012

(30) Foreign Application Priority Data

May 31, 2012 (JP) .................................. 2012-125175

(51) Int. Cl.
*G06F 17/00* (2006.01)
(52) U.S. Cl.
USPC .......................................................... 463/42
(58) Field of Classification Search
USPC ......................................... 463/16–25, 40–43
See application file for complete search history.

(56) References Cited

U.S. PATENT DOCUMENTS

| 8,177,634 B2* | 5/2012 | Herrmann et al. | 463/25 |
| 2005/0096966 A1* | 5/2005 | Adi et al. | 705/10 |
| 2009/0271661 A1* | 10/2009 | Miyai et al. | 714/35 |
| 2012/0122553 A1* | 5/2012 | Bunch et al. | 463/23 |

FOREIGN PATENT DOCUMENTS

JP 2009-125107 6/2009

OTHER PUBLICATIONS

Japanese Office Action mailed Sep. 4, 2012.

* cited by examiner

*Primary Examiner* — Ronald Laneau
(74) *Attorney, Agent, or Firm* — IPUSA, PLLC

(57) ABSTRACT

A game processing server apparatus, to which plural terminal devices each being operated by a player are connected via a network, configured to provide a game service to the plural terminal devices, includes a player management unit which manages an association of a target player with other plural players; and an event management unit which controls a generation of a predetermined event, manages an event generation status for each of the target player and the players associated with the target player, determines whether a specific event is already generated for the target player and the players associated with the target player by referring to the event generation status for each of the target player and the players associated with the target player, determines, based on the determined result, an event to be generated for the target player.

7 Claims, 8 Drawing Sheets

FIG.5

| PLAYER ID | ICON DATA | PLAYER NAME | TEAM | STATUS | (SPECIFIC EVENT STATUS) | .. |
|---|---|---|---|---|---|---|
| 1 | ICON DATA #1 | aaa | A(B) | 5 | FOUND BOSS | .. |
| 2 | ICON DATA #2 | bbb | A(B) | 1 | NOT FOUND BOSS | .. |
| 3 | ICON DATA #3 | ccc | B(A) | 3 | NOT FOUND BOSS | .. |
| 4 | ICON DATA #4 | ddd | A(B) | 4 | NOT FOUND BOSS | .. |
| 5 | ICON DATA #5 | eee | B(A) | 4 | NOT FOUND BOSS | .. |
| 6 | ICON DATA #6 | fff | B(A) | 2 | | .. |
| .. | .. | .. | .. | .. | .. | .. |
| .. | .. | .. | .. | .. | .. | .. |
| .. | .. | .. | .. | .. | .. | .. |

FIG.7

| TIME ZONE | CONDITION OF SPECIFIC EVENT STATUS (FOR TEAM) | CANDIDATE EVENT | SCREEN NUMBER | WEIGHT |
|---|---|---|---|---|
| CORE TIME | ONLY OWN TEAM FOUND BOSS | INCREASING ABILITY | 2 | 1 |
| CORE TIME | ONLY OWN TEAM FOUND BOSS | INCREASING ABILITY | 3 | 35 |
| CORE TIME | ONLY OWN TEAM FOUND BOSS | INCREASING ABILITY | 4 | 20 |
| CORE TIME | ONLY OWN TEAM FOUND BOSS | INCREASING ABILITY | 5 | 10 |
| CORE TIME | ONLY OWN TEAM FOUND BOSS | BONUS | 2 | 3 |
| CORE TIME | ONLY OWN TEAM FOUND BOSS | BONUS | 3 | 15 |
| CORE TIME | ONLY OWN TEAM FOUND BOSS | BONUS | 4 | 5 |
| CORE TIME | ONLY OWN TEAM FOUND BOSS | BONUS | 5 | 10 |
| CORE TIME | ONLY OPPOSING TEAM FOUND BOSS | INCREASING ABILITY | 2 | 1 |
| CORE TIME | ONLY OPPOSING TEAM FOUND BOSS | INCREASING ABILITY | 3 | 1 |
| CORE TIME | ONLY OPPOSING TEAM FOUND BOSS | INCREASING ABILITY | 4 | 20 |
| CORE TIME | ONLY OPPOSING TEAM FOUND BOSS | INCREASING ABILITY | 5 | 10 |
| CORE TIME | ONLY OPPOSING TEAM FOUND BOSS | BOSS CHARACTER | 2 | 1 |
| CORE TIME | ONLY OPPOSING TEAM FOUND BOSS | BOSS CHARACTER | 3 | 2 |
| CORE TIME | ONLY OPPOSING TEAM FOUND BOSS | BOSS CHARACTER | 4 | 50 |
| CORE TIME | ONLY OPPOSING TEAM FOUND BOSS | BOSS CHARACTER | 5 | 45 |
| CORE TIME | BOTH TEAMS NOT FOUND BOSS | INCREASING ABILITY | 2 | 5 |
| CORE TIME | BOTH TEAMS NOT FOUND BOSS | INCREASING ABILITY | 3 | 15 |
| CORE TIME | BOTH TEAMS NOT FOUND BOSS | INCREASING ABILITY | 4 | 15 |
| CORE TIME | BOTH TEAMS NOT FOUND BOSS | INCREASING ABILITY | 5 | 10 |
| CORE TIME | BOTH TEAMS NOT FOUND BOSS | BOSS CHARACTER | 2 | 1 |
| CORE TIME | BOTH TEAMS NOT FOUND BOSS | BOSS CHARACTER | 3 | 15 |
| CORE TIME | BOTH TEAMS NOT FOUND BOSS | BOSS CHARACTER | 4 | 15 |
| CORE TIME | BOTH TEAMS NOT FOUND BOSS | BOSS CHARACTER | 5 | 10 |
| : | : | : | : | : |
| : | : | : | : | : |

GAME PROCESSING SERVER APPARATUS AND GAME PROCESSING SERVER SYSTEM

BACKGROUND OF THE INVENTION

1. Field of the Invention

The present invention relates to a game processing server apparatus and a game processing server system.

2. Description of the Related Art

A social game is provided in a social networking service (SNS), and is an online game in which a player plays the game while having communications with other players. As the social game is provided in the SNS, which is proposed for providing communications between participants, the social game is configured to provide more communications to the players compared with a previously known online game although such an online game also provides communications to the players.

As one kind of such social games, a social Role Playing Game (RPG) is known. In the social RPG, a quest (mission) is provided in which a player character operated by a player (user) goes through a predetermined area in a map while playing the game.

In this quest, various events are set to occur when the player character goes through the predetermined area while consuming energy points or the like. For example, the player character can learn magic power, a skill or the like by encountering and defeating an enemy character or encountering a bonus item. Further, when the player clears a quest in an area where a boss character is set, the boss character appears so that the player character can fight against the boss character. When the player character defeats the boss character, the player character can get a weapon or a reward.

Thus, the player tries to clear quests and expects to obtain an ability, a weapon, a reward or the like through the predetermined events.

In a previously known RPG or in a social RPG, the event to occur in the same quest is set to be almost the same for all of the players based on a scenario of the game.

Even in such a case, as long as the player enjoys the game by himself or herself, there may be no problem. Even when the same event occurs in the same quest for all of the players, the player recognizes the game as provided.

However, for the social game, the players often have communications with other players, and sometimes, the players make a team to compete with other teams. Thus, the players often know what kind of event is to occur and what will happen as a result in a specific quest before the player actually plays the quest. In such a case, if the event occurs as the player expects, the player can easily predict the result of the game so that the player may have a tedious feeling thereby lowering the enjoyment of the game.

SUMMARY OF THE INVENTION

The present invention is made in light of the above problems, and provides a game processing server apparatus and a game processing server system capable of increasing adventurousness in generating an event so that a player does not have a tedious feeling in playing a game.

According to an embodiment, there is provided a game processing server apparatus, to which plural terminal devices each being operated by a player are connected via a network, configured to provide a game service to the plural terminal devices, including a player management unit which manages an association of a target player with other of the plural players; and an event management unit which controls a generation of a predetermined event, manages an event generation status for each of the target player and the players associated with the target player, determines whether a specific event is already generated for the target player and the players associated with the target player by referring to the event generation status for each of the target player and the players associated with the target player, determines, based on the determined result, an event to be generated for the target player by referring to a table in which plural candidate events are in correspondence with conditions of a status of the specific event and weights, respectively, each of the conditions indicating whether the specific event is generated for the target player and the other players associated with the target player, and randomly selecting the event to be generated for the target player from the candidate events for which the conditions are met using the weights, and generates a new event in accordance with the determined event.

According to another embodiment, there is provided a game processing server system including the above game processing server apparatus; and a player information database including a record of the plural players in which each of the players is in correspondence with a status indicating whether the specific event is generated for the respective player, wherein the event management unit determines whether the specific event is already generated for the target player and the players associated with the target player based on the record.

Note that also arbitrary combinations of the above-described constituents, and any exchanges of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 5 is a view showing an example of a data structure of player information stored in a player information database;

FIG. 7 is a view showing an example of a data structure of an event management table stored in the quest/event information storing unit.

DETAILED DESCRIPTION OF THE PREFERRED EMBODIMENTS

Figure 1:
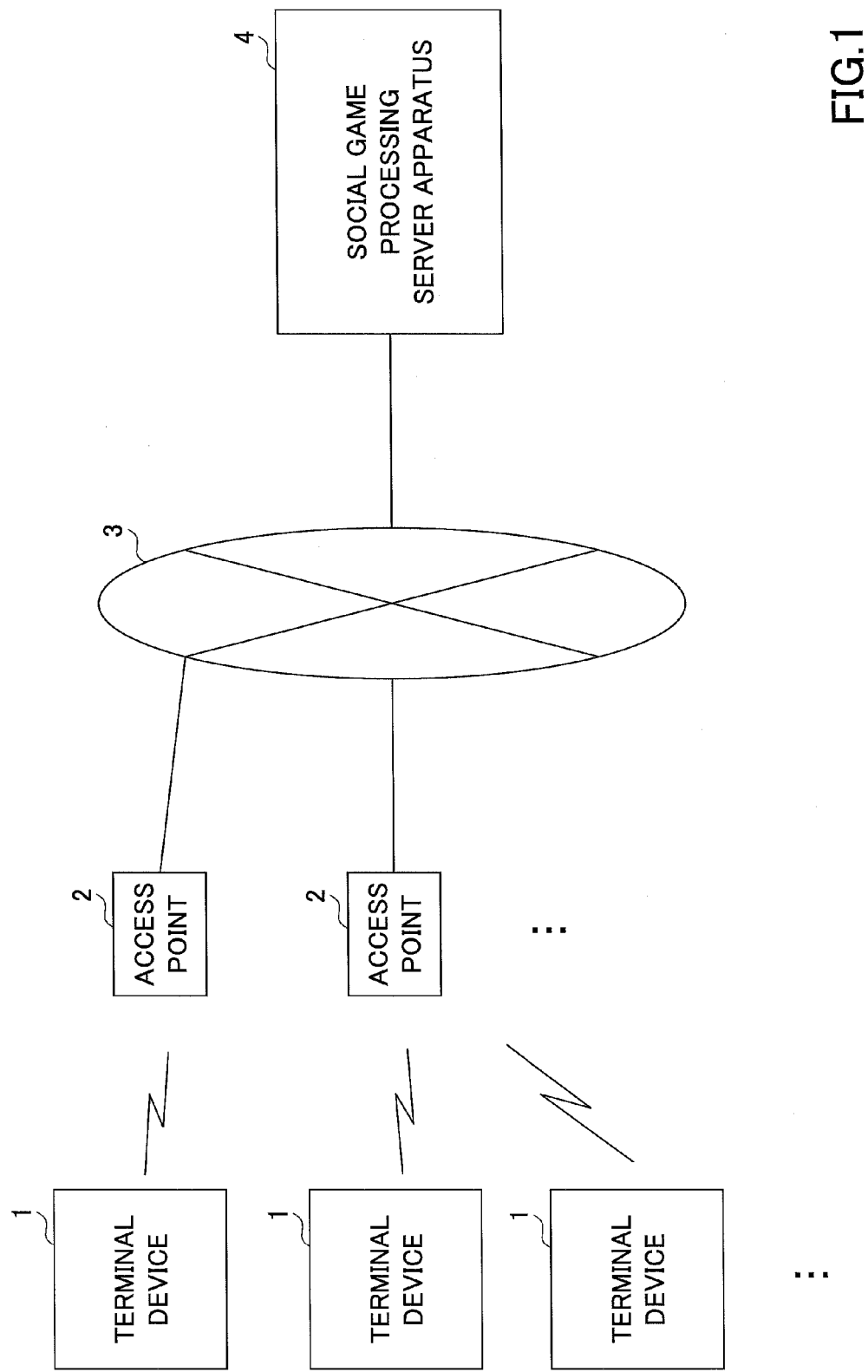
FIG. 1 is a block diagram showing a structure of an example of a system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Structure)

FIG. 1 is a block diagram showing a structure of an example of a system of an embodiment.

The system shown in FIG. 1 includes plural terminal devices 1 which belong to players (users), respectively, access points 2 such as a mobile base station, a Wi-Fi station or the like, a network 3 such as the INTERNET or the like, and a social game processing server apparatus 4. The social game processing server apparatus 4 controls processing of a social game (social network game) in which plural players play a game via the network 3.

Figure 2:
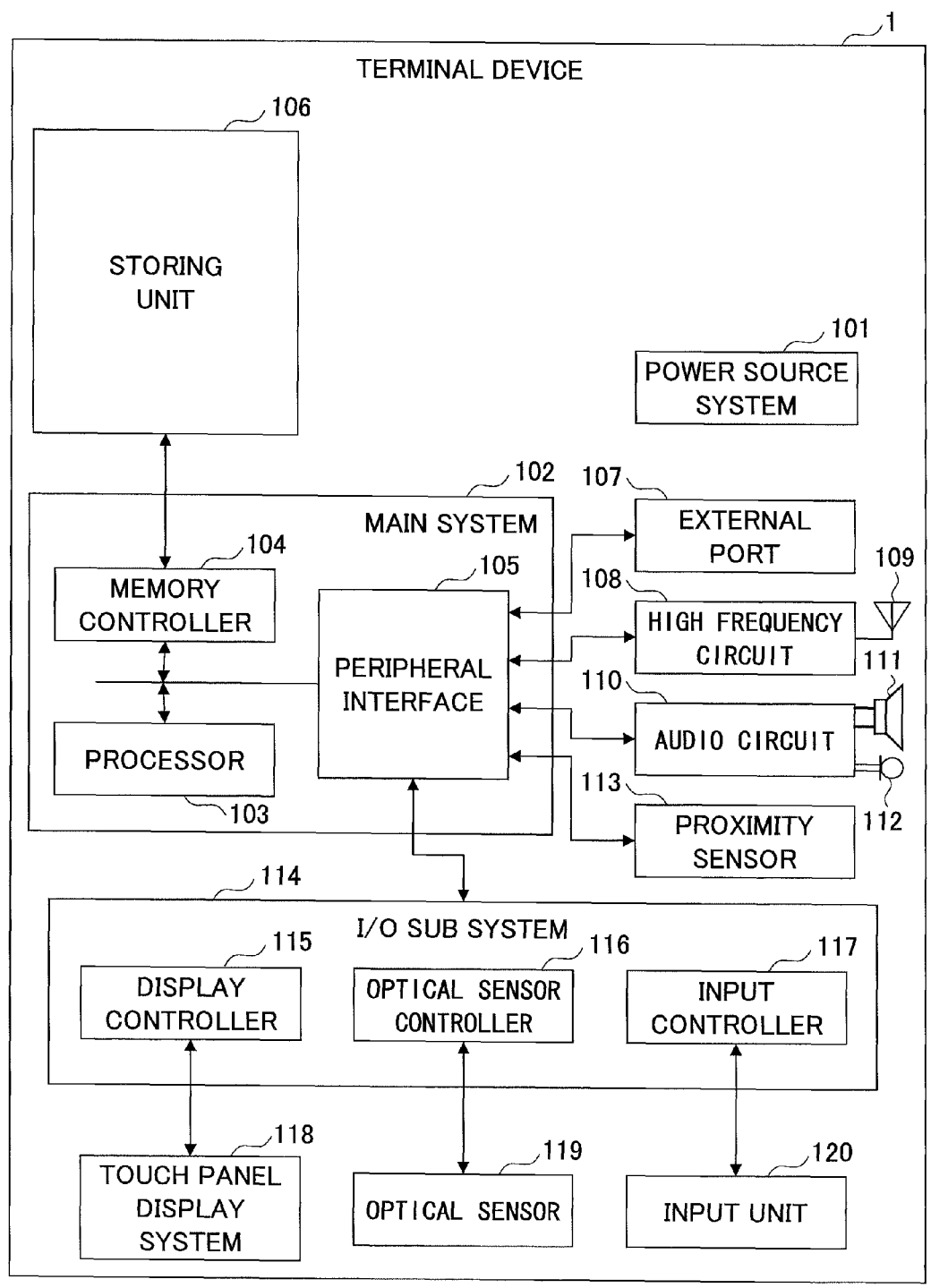
FIG. 2 is a block diagram showing an example of a hardware structure of a terminal device.

FIG. 2 is a block diagram showing an example of a hardware structure of the terminal device 1. The terminal device 1 may be a smart phone, a mobile phone or the like.

The terminal device 1 includes a power source system 101, a main system 102, a storing unit 106, an external port 107, a high frequency circuit 108, an antenna 109, an audio circuit 110, a speaker 111, a microphone 112, a proximity sensor 113, an I/O sub system 114, a touch panel display system 118, an optical sensor 119 and an input unit 120. The main system 102 includes a processor 103, a memory controller 104 and a peripheral interface 105. The I/O sub system 114 includes a display controller 115, an optical sensor controller 116, and an input controller 117.

Figure 3:
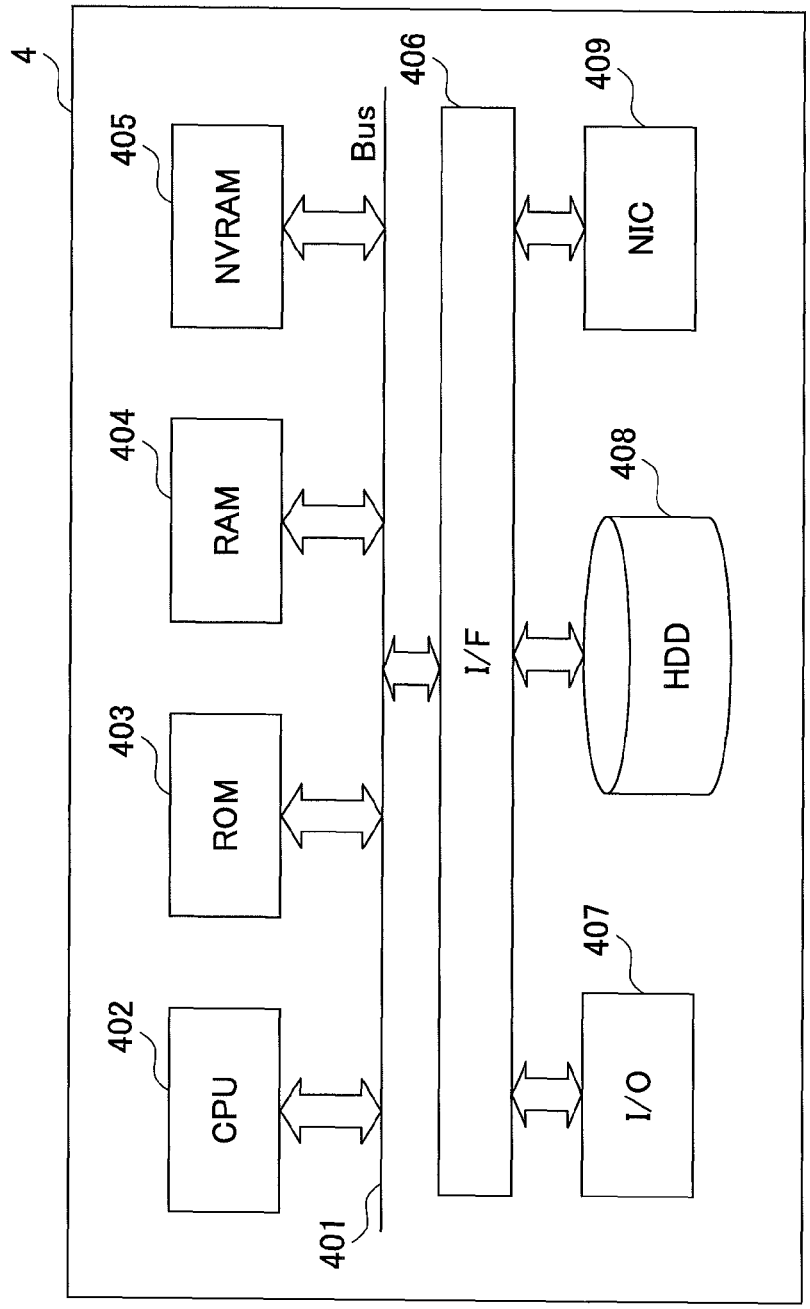
FIG. 3 is a block diagram showing an example of a hardware structure of a social game processing server apparatus.

FIG. 3 is a block diagram showing an example of a hardware structure of the social game processing server apparatus 4.

The social game processing server apparatus 4 includes a Central Processing Unit (CPU) 402, a Read Only Memory (ROM) 403, a Random Access Memory (RAM) 404, a non-Volatile Random Access Memory (NVRAM) 405 and an Interface (I/F) 406 connected to a system bus 401, and an Input/Output Device (I/O) 407 such as a keyboard, a mouse, a monitor, a Compact Disk/Digital Versatile Disk (CD/DVD) drive or the like, a Hard Disk Drive (HDD) 408, and a Network Interface Card (NIC) 409 connected to the I/F 406, and the like.

Figure 4:
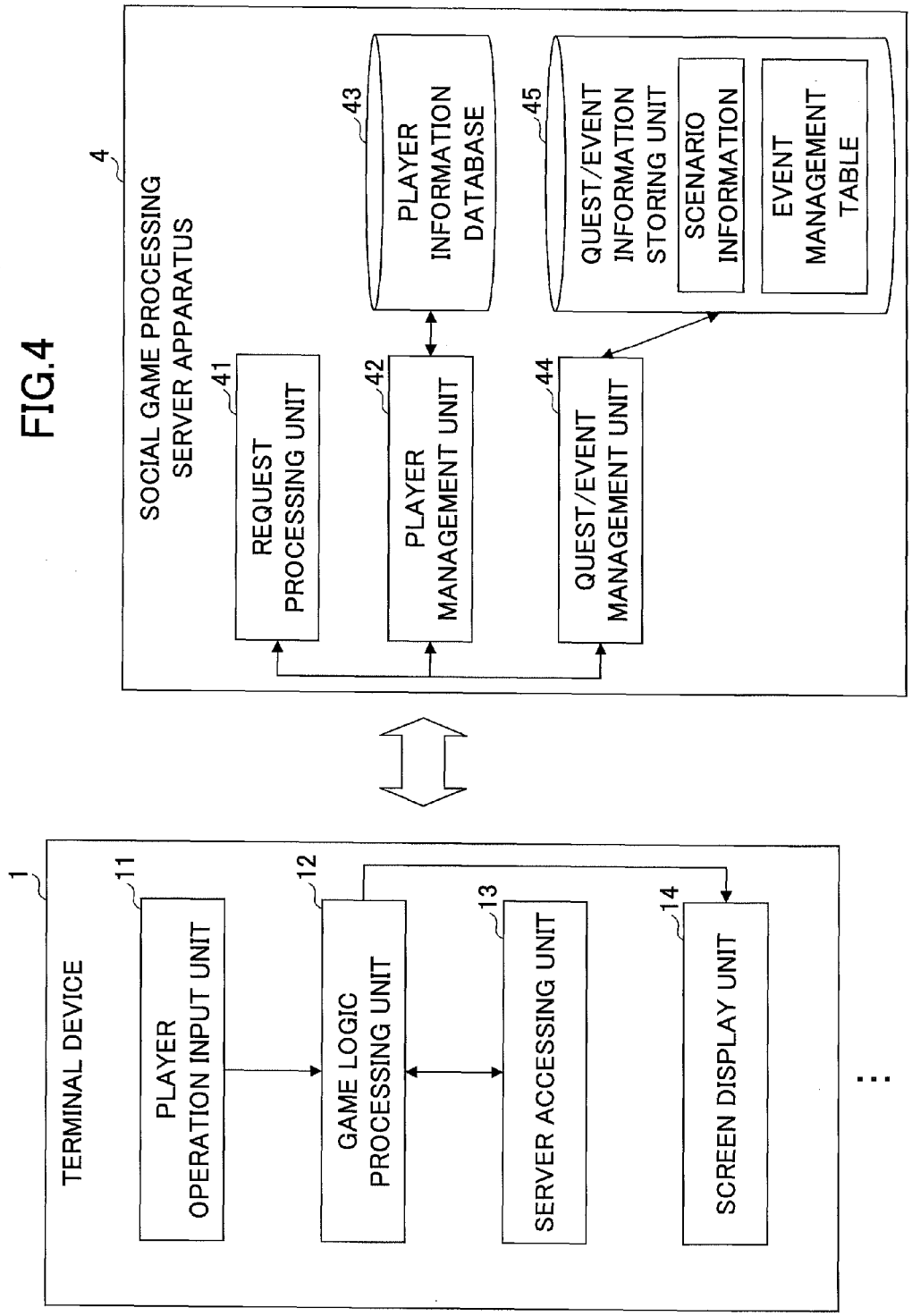
FIG. 4 is a block diagram showing an example of a functional structure of the terminal device and the social game processing server apparatus.

FIG. 4 is a block diagram showing an example of a functional structure of the terminal device 1 and the social game processing server apparatus 4.

In FIG. 4, the terminal device 1 includes a player operation input unit 11, a game logic processing unit 12, a server accessing unit 13, and a screen display unit 14.

The player operation input unit 11 has a function to input (accept) an operation of a player (user) of the terminal device 1.

The game logic processing unit 12 has a function to process a game by transitioning screens displayed by the screen display unit 14 in accordance with the operation by the player accepted via the player operation input unit 11.

The server accessing unit 13 has a function to communicate with the social game processing server apparatus 4. Specifically, the server accessing unit 13 sends a request to the social game processing server apparatus 4 when it is necessary to access the social game processing server apparatus 4 in the processing of the game logic processing unit 12. Then, the server accessing unit 13 receives a processed result or the like as a response from the social game processing server apparatus 4. Here, the request includes a request of updating and a request of referring to data. The request of updating is a request of processing an operation including updating player information. The request of referring to data is a request of processing an operation including referring to the player information.

The screen display unit 14 has a function to display screens on the touch panel display system 118 under control of the game logic processing unit 12.

The social game processing server apparatus 4 includes a request processing unit 41, a player management unit 42, a player information database 43, a quest/event management unit 44, and a quest/event information storing unit 45.

The request processing unit 41 has a function to receive a request from the terminal device 1 and process necessary operations. The request processing unit 41 further has a function to send the processed result of the request to the terminal device 1 as a response.

For the request of updating, the request processing unit 41 processes an operation including updating the player information, and the processed result may include the updated player information or the like. For the request of referring to data, the request processing unit 41 processes an operation including referring to the player information and obtaining a value of the player information. At this time, the processed result may include the obtained value of the player information. Further, the response includes screen information on which the player is to operate next, in addition to the required processed result.

The player management unit 42 has a function to manage various information items about all of the players participating in the game, which are stored in the player information database 43. The player management unit 42 refers to and updates the player information in accordance with a request by the request processing unit 41 or the quest/event management unit 44. An example of a data structure of the player information is explained later in detail.

The quest/event management unit 44 has a function to manage scenario information, an event management table and the like, which are stored in the quest/event information storing unit 45.

The request processing unit 41 obtains information such as the scenario information and the event management table or the like stored in the quest/event information storing unit 45 based on the request received from the terminal device 1. Then, the request processing unit 41 controls a generation of a quest (mission) or an event in accordance with a progression of the game in the terminal device 1. Examples of data structures of the scenario information and the event management table are explained later in detail.

FIG. 5 is a view showing an example of a data structure of the player information stored in the player information database 43. The player information is an example of a "record of the plural players".

In FIG. 5, the player information includes items (fields) such as "player ID", "icon data", "player name", "team", "status", "specific event status" and the like.

The "player ID" is data to specify (identify) the player. The "icon data" is data to specify a displayed icon of the player. The "player name" is data indicating displayed name of the player.

The "team" is data indicating a team to which the player belongs and an opposing team to compete against for a common boss character.

The "status" is data indicating a status of the progression of the game for the player.

The "specific event status" is data of a status indicating whether a specific event is already generated (happened) for the respective player. In this embodiment, the specific event is "find a boss character".

For the case shown in FIG. 5, the players named "aaa", "bbb" and "ddd" belong to the same team "A" whose opposing team is "B". Similarly, the players named "ccc", "eee" and "fff" belong to the same team "B" whose opposing team is "A". Further, only the player "aaa" has found the boss character among the players "aaa" to "fff".

In other words, the player named "bbb", for example, is associated with the players named "aaa" and "ddd" as being in the same team, and also associated with the players named "ccc", "eee" and "fff" as being on the opposing team.

Further, each of the players is in correspondence with the "specific event status".

As will be explained later, the event management unit 44 determines an event to be generated for a target player, for example, the player named "bbb", based on a result obtained by determining whether the specific event is already generated for the players associated with the target player based on the player information stored in the player information database 43.

Alternatively, the "status" may include information of the "specific event status" and in such a case, the item "specific event status" may be omitted.

Figure 6:
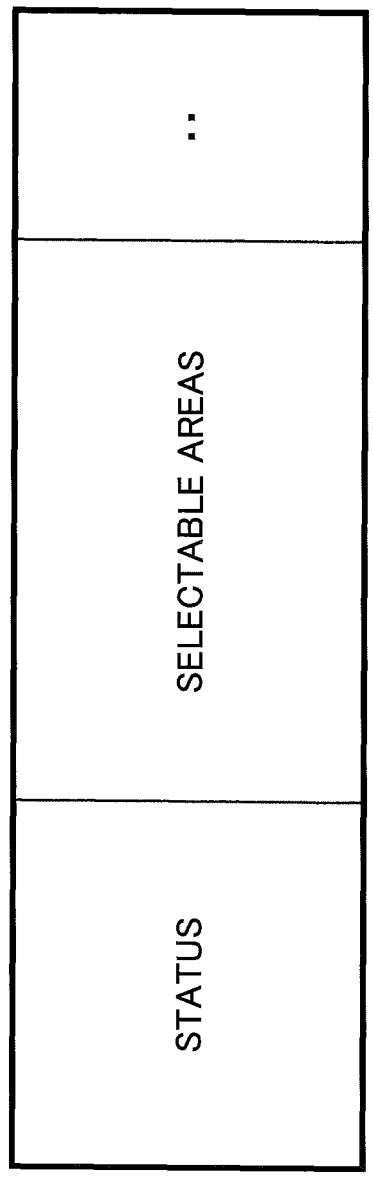
FIG. 6 is a view showing an example of a data structure of scenario information stored in a quest/event information storing unit.

FIG. 6 is a view showing an example of a data structure of the scenario information stored in the quest/event information storing unit 45.

In FIG. 6, the scenario information includes a status (mainly a stage) in correspondence with selectable areas (areas on a map at each of which a quest occurs). Generally, the areas are aligned in an order from easier to be conquered to harder to be conquered. First, only the areas easier to be conquered are set to be selectable.

FIG. 7 is a view showing an example of a data structure of the event management table stored in the quest/event information storing unit 45.

In FIG. 7, the event management table includes items (fields) such as "time zone", "condition of specific event status (for team)", "candidate event", "screen number", "weight" and the like.

The "time zone" is data for specifying a kind of time. The "time zone" includes "core time" in which many players are expected to participate in the game, "non-core time" in which the number of players participating in the game is expected to be small, "maintenance time" in which maintenance of an operating side is performed, and the like. Although not shown in the drawing, the social game processing server apparatus 4 may include a table in which the time (corresponding to a current time) and the time zone are in correspondence with each other.

The "condition of specific event status (for team)" is data of a condition of a status indicating whether the specific event is already generated (happened) for the players in the own team and the opposing team. As described above, as the specific event is "find a boss character" in this embodiment, the "condition of specific event status (for team)" includes "only own team found boss", "only opposing team found boss", "both teams not found boss", "both teams found boss" and the like.

The "candidate event" is data for specifying a candidate event to be generated for the target player. The "candidate event" includes events such as "increasing ability", "bonus", "boss character" and the like.

The "screen number" is data indicating the number of screens to be displayed until the respective event occurs. Here, instead of using the word "screen number", a word "step number" may be used provided that the screen is transferred for each of the steps of the player character. Even when the same event occurs, if the screen number is different, a different impression can be provided to the player. Thus, records of the same event with different screen numbers are differentiated in this embodiment.

The "weight" is a value which corresponds to a probability of the respective candidate event to be randomly selected by a drawing or the like.

(Operation)

Figure 8:
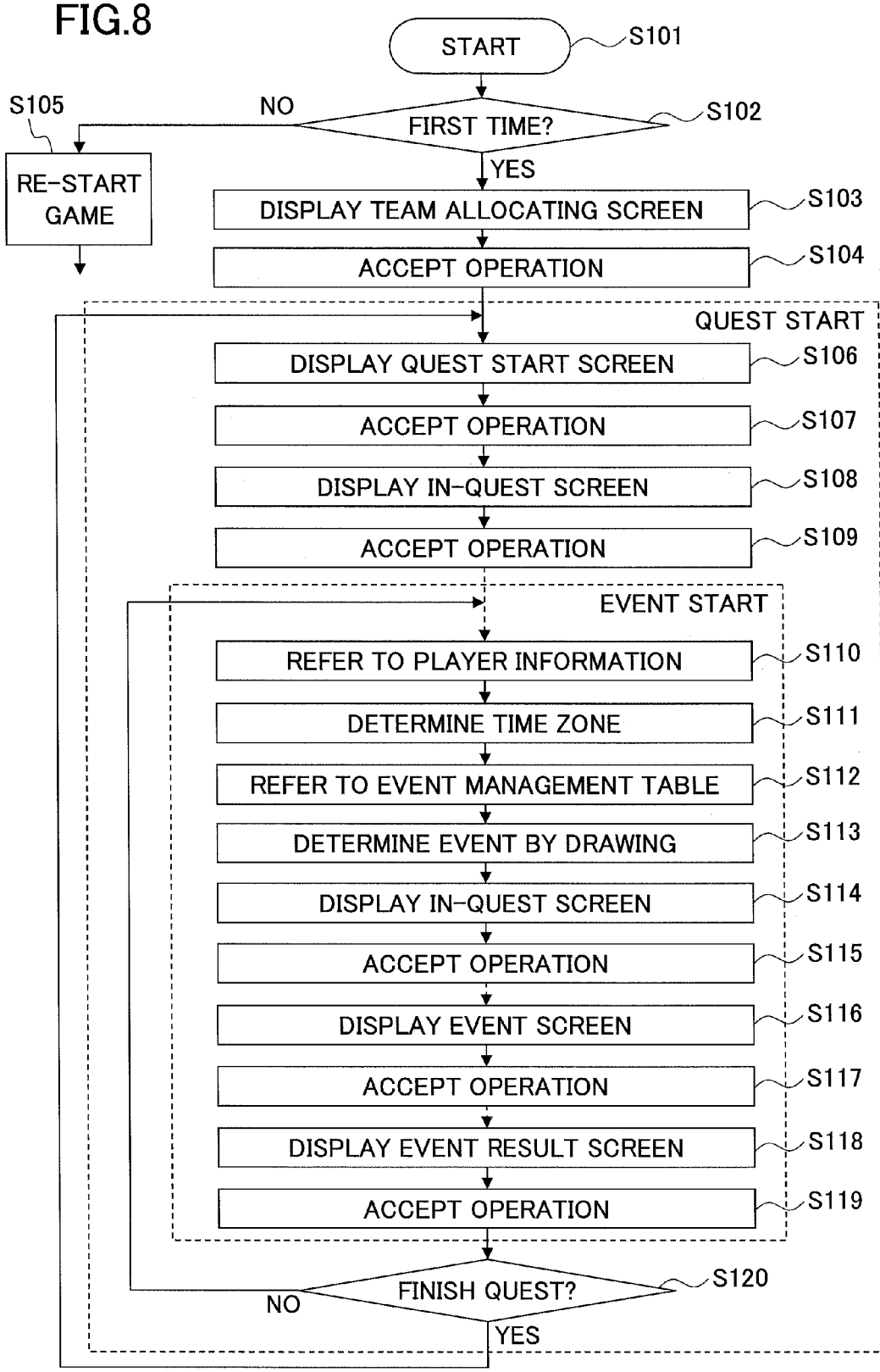
FIG. 8 is a flowchart showing an example of an operation of the terminal device and the social game processing server apparatus of the embodiment.

FIG. 8 is an example of a flowchart showing an operation of the terminal device 1 and the social game processing server apparatus 4 of the embodiment.

Here, it is assumed that the player, who is the target player, who operates the terminal device 1 is previously logged in to the social game processing server apparatus 4 so that the social game processing server apparatus 4 can specify the player ID of the target player.

At the terminal device 1, when the player operation input unit 11 accepts an operation by the player to start the game, the game logic processing unit 12 recognizes the operation to start the game. Then, the server accessing unit 13 transmits the operation to start the game to the social game processing server apparatus 4.

Then, at the social game processing server apparatus 4, the request processing unit 41 recognizes the operation to start the game and starts the processing (step S101). In the following, the operation of the request processing unit 41 to access (update) data stored in the player information database 43 is performed via the player management unit 42, and the operation of the request processing unit 41 to access (update) data stored in the quest/event information storing unit 45 is performed via the quest/event management unit 44 unless otherwise explained.

First, the request processing unit 41 determines whether it is the first time for the player to play the game (step S102). Specifically, the request processing unit 41 refers to the player information (FIG. 5) of the player information database 43 based on the player ID. Then, the request processing unit 41 can determine whether it is the first time for the player to play the game by determining whether the status of the respective player is set as an initial value.

When it is determined to be the first time for the player to play the game (YES of step S102), the request processing unit 41 allocates the player to one of the teams. Then, the request processing unit 41 sends screen information including a result of the allocation to have the terminal device 1 display a team allocating screen (step S103).

The allocation of the player to the team may be performed based on a predetermined rule. Alternatively, the allocation of the player to the team may be performed as follows. The request processing unit 41 selects a team for which the number of the players belonging to is small based on the player information stored in the player information database 43. Then, the request processing unit 41 updates the team for the player in the player information stored in the player information database 43.

The allocation of the team can be assumed as associating the target player with the other players as is explained above with reference to FIG. 5.

When the screen information including the result of the allocation is sent to the terminal device 1 and the server accessing unit 13 receives the screen information, the screen display unit 14 displays the team allocating screen under control of the game logic processing unit 12.

Then, at the terminal device 1, when the player operation input unit 11 accepts an operation of confirmation by the player (step S104), the server accessing unit 13 sends the confirmation by the player to the social game processing server apparatus 4 under control of the game logic processing unit 12. Then, at the social game processing server apparatus 4, the request processing unit 41 starts the subsequent processing. Here, the allocation of the team may be automatically performed at background without displaying the team allocating screen or the screen of confirmation for the player.

When it is determined that it is not the first time for the player to play the game (NO of step S102), the above operation of the allocation of the team is not performed as the player is already allocated to the team. Then, the operation previously interrupted is re-started (step S105). The re-starting of the operation is performed as follows. The request processing unit 41 refers to the status in the player information stored in the player information database 43 based on the player ID of the player and specifies the processing corresponding to the status.

After the confirmation of the allocation (step S104) or when the game is re-started (step S105), the request processing unit 41 controls the terminal device 1 to display a quest start screen from which the player is capable of selecting a desired area to play the quest (step S106).

Specifically, the request processing unit 41 refers to the player information stored in the player information database 43 based on the player ID of the player and obtains the status. Then, based on the obtained status, the request processing unit 41 refers to the scenario information (FIG. 6) stored in the quest/event information storing unit 45 and obtains the selectable areas corresponding to the status (stage). Then, the request processing unit 41 generates the quest start screen from the obtained selectable areas and sends the quest start screen to the terminal device 1.

Then, at the terminal device 1, when the server accessing unit 13 receives the quest start screen, the screen display unit 14 displays the quest start screen under control of the game logic processing unit 12.

Then, when the player operation input unit 11 accepts a selection of the area by the player (step S107), the server accessing unit 13 sends the selection by the player to the social game processing server apparatus 4 under control of the game logic processing unit 12. Then, the quest is started.

When the quest is started, the request processing unit 41 controls the terminal device 1 to display an "in-quest screen" including an image in which the player character goes through the selected area (step S108). It means that the request processing unit 41 sends the "in-quest screen" to the terminal device 1. Then, when the server accessing unit 13 of the terminal device 1 receives the in-quest screen, the screen display unit 14 displays the in-quest screen under control of the game logic processing unit 12.

Then, when the player operation input unit 11 of the terminal device 1 accepts an operation by the player to proceed or the like (step S109), the server accessing unit 13 sends the operation by the player to the social game processing server apparatus 4 under control of the game logic processing unit 12. Then, the request processing unit 41 of the social game processing server apparatus 4 starts the subsequent processing. When the displaying of the in-quest screens continues, the above operation is repeated.

Then, the request processing unit 41 refers to the player information stored in the player information database 43 based on the player ID of the player (target player) and obtains the specific event statuses of the target player and the other players associated with the target player. At this time, the request processing unit 41 differentiates the other players who belong to the same team (own team) with the target player and who belong to the opposing team of the target player. Then, the request processing unit 41 determines the specific event status for the team of the target player (step S110). Specifically, these operations may be performed by the player management unit 42 and the quest/event management unit 44 under control of the request processing unit 41.

For example, for the case shown in FIG. 5, it is assumed that the target player is the player named "bbb" and only the player named "aaa", who belongs to the same team as the player named "bbb", has already found the boss character. In such a case, the specific event status for team for the target player becomes "only own team found boss". Alternatively, when it is assumed that the target player is the player named "ccc" and only the player named "aaa", who belongs to the opposing team of the player named "bbb", has already found the boss character, the specific event status for team for the target player becomes "only opposing team found boss". Further, alternatively, when it is assumed that the target player is the player named "bbb" and nobody in the teams A and B has found the boss character, the specific event status for team for the target player becomes "both teams not found boss".

Alternatively, the player information database 43 may include an item "specific event status for team" and the request processing unit 41 may update data for the "specific event status for team" every time when the specific event is generated for any of the players.

Then, the request processing unit 41 obtains the current time, and then refers to the table, not shown in the drawings, in which the current time and the time zone are in correspondence with each other. Then, the request processing unit 41 determines the time zone to which the current time belongs (step S111).

Then, the request processing unit 41 refers to the event management table (FIG. 7) stored in the quest/event information storing unit 45. Then, the request processing unit 41 selects the candidate events for which the specific event status for team for the target player and the time zone determined as above meet the condition of specific event status for team and the time zone set in the event management table. Then, the request processing unit 41 obtains the selected candidate events and the screen numbers and the weights of the selected events, respectively, (step S112).

Then, the request processing unit 41 randomly selects an event to be generated for the target player in accordance with a probability which is in proportion to the obtained weights (step S113).

For example, when the specific event status for team determined as above is "only own team found boss" and the time zone determined as above is "core time", for the case shown in FIG. 7, eight records from the upper side in the event management table meet the determined condition for the target player. In such a case, a ratio of the respective weight with respect to a total weight of the eight records, 1+35+20+10+3+15+5+10=99, is set to be a probability for each of the records. Then, the event to be generated for the target player is randomly selected.

Specifically, these operations to determine the event to be generated for the target player may be performed by the quest/event management unit 44 under control of the request processing unit 41.

Here, as explained above, the events are differentiated when the screen number is different even when the names of the events are the same.

Here, in this embodiment, although the records in each of which the time zone is set to be "core time" are assumed, records in each of which the time zone is set to be "non-core time" or "maintenance time" may be further provided and weights may be set in accordance with an operation policy.

Referring back to FIG. 8, the request processing unit 41 repeats an operation in which the in-quest screens of the screen number of the determined event are displayed (step S114) and operations by the player to proceed or the like are accepted (step S115).

Thereafter, when the in-quest screens of the screen number of the determined event are displayed, the request processing unit 41 controls the terminal device 1 to display an event screen including an image of the event as determined above (step S116). In other words, the request processing unit 41 sends the event screen to the terminal device 1. Then, when the server accessing unit 13 of the terminal device 1 receives the event screen, the screen display unit 14 displays the event screen under control of the game logic processing unit 12.

Then, when the player operation input unit 11 of the terminal device 1 accepts an operation by the player of the event (step S117), the server accessing unit 13 sends the operation by the player to the social game processing server apparatus 4 under control of the game logic processing unit 12. Then, the request processing unit 41 of the social game processing server apparatus 4 starts the subsequent processing. When the event screen is composed of plural screens, the above operation is repeated.

Thereafter, when the event ends in accordance with the operation by the player, the request processing unit 41 controls the terminal device 1 to display an event result screen including the result of the event (step S118). In other words, the request processing unit 41 sends the event result screen to the terminal device 1. Then, when the server accessing unit 13 of the terminal device 1 receives the event result screen, the screen display unit 14 displays the event result screen under control of the game logic processing unit 12. As the result of the event, the player character can obtain an ability such as magic power, a skill or the like, a weapon, or a reward.

Then, when the player operation input unit 11 of the terminal device 1 accepts an operation by the player of confirmation or the like (step S119), the server accessing unit 13 sends the confirmation by the player to the social game processing server apparatus 4 under control of the game logic processing unit 12. Then, the request processing unit 41 of the social game processing server apparatus 4 starts the subsequent processing.

Thereafter, the request processing unit 41 determines whether the quest is finished (step S120). Whether the quest is finished may be determined based on whether the player character has reached the end of the area.

When it is determined that the quest is not finished (NO of step S120), the operation moves back to step S110.

When it is determined that the quest is finished (YES of step S120), the operation moves back to step S106.

Here, in the above processes, the player operating the terminal device 1 can stop the game before and after the operation, and can start the game from the same status when re-starting the game.

In this embodiment, the request processing unit 41, the quest/event management unit 44, and the player management unit 42 function as an event generating control unit which controls generation of a predetermined event and an event generated status management unit which manages an event generated status of each of the players.

Further, the components of the social game processing server apparatus 4 may not be included in a single apparatus and may be provided in plural apparatuses connected via a network or the like with each other. For example, the player information database 43 or the quest/event information storing unit 45 may be provided in a different apparatus from an apparatus including the request processing unit 41, the player management unit 42 and the quest/event management unit 44.

The social game processing server apparatus 4 or a system including such apparatuses may be referred to as a "game processing server system".

The individual constituents of the social game processing server apparatus 4 or each of the terminal devices 1 may be embodied by arbitrary combinations of hardware and software, typified by a CPU of an arbitrary computer, memory, a program loaded in the memory so as to embody the constituents illustrated in the drawings, storage units for storing the program such as a hard disk, and an interface for network connection. It may be understood by those skilled in the art that methods and devices for the embodiment allow various modifications.

As described above, according to the embodiment, adventurousness in generating an event can be increased so that a player does not have a tedious feeling in playing a game.

According to the embodiment, a game processing server apparatus and a game processing server system capable of increasing adventurousness in generating an event so that a player does not have a tedious feeling in playing a game can be provided.

Although a preferred embodiment of the game processing server apparatus and the game processing server system has been specifically illustrated and described, it is to be understood that minor modifications may be made therein without departing from the spirit and scope of the invention as defined by the claims.

The present invention is not limited to the specifically disclosed embodiments, and variations and modifications may be made without departing from the scope of the present invention.

The present application is based on Japanese Priority Application No. 2012-125175 filed on May 31, 2012, the entire contents of which are hereby incorporated by reference.

What is claimed is:

1. A game processing server apparatus, to which plural terminal devices each being operated by a player are connected via a network, configured to provide a game service to the plural terminal devices, comprising:
   a player management unit which manages an association of a target player with other plural players; and
   an event management unit which
      manages event generation statuses for the target player and the players associated with the target player, respectively,
      determines whether a specific event is already generated for the target player and the players associated with the target player by referring to the event generation statuses for the target player and the players associated with the target player, respectively,
      refers to a table in which plural candidate events are in correspondence with conditions of a status of the specific event and weights, respectively, each of the conditions indicating whether the specific event is generated for the target player and the players associated with the target player, and
      randomly selects an event to be generated for the target player from the candidate events for which the conditions are met using the weights, and
      generates the selected event as a new event for the target player.

2. The game processing server apparatus according to claim 1,
   wherein the association of the target player includes an association of the target player with the other of the players in a same team with the target player and an association of the target player with the other of the players in an opposing team to compete with.

3. The game processing server apparatus according to claim 1,
wherein the plural candidate events include records for which the event itself is the same but the number of screens displayed before the event starts are different.

4. The game processing server apparatus according to claim 1,
wherein in the table, the plural candidate events are further in correspondence with time zones to which a current time is to be included, and
the event management unit randomly selects the event to be generated for the target player from the candidate events for which the conditions and the time zones are respectively met using the weights.

5. A game processing server system, comprising:
the game processing server apparatus according to claim 1; and
a player information database including a record of the target player and the players associated with the target player in which each of the players is in correspondence with a status indicating whether the specific event is generated for the respective player,
wherein the event management unit determines whether the specific event is already generated for the target player and the players associated with the target player based on the record.

6. The game processing server system, according to claim 5, further comprising:
the table in which the plural candidate events are in correspondence with the conditions of the status of the specific event and weights, respectively.

7. A non-transitory computer-readable recording medium having recorded thereon a program that causes a computer, to which plural terminal devices each being operated by a player are connected via a network, to provide a game service to the plural terminal devices and to execute a game processing method comprising:
a player management step of managing an association of a target player with other plural players; and
an event management step of
managing event generation statuses for the target player and the players associated with the target player, respectively,
determining whether a specific event is already generated for the target player and the players associated with the target player by referring to the event generation statuses for the target player and the players associated with the target player, respectively,
referring to a table in which plural candidate events are in correspondence with conditions of a status of the specific event and weights, respectively, each of the conditions indicating whether the specific event is generated for the target player and the other players associated with the target player, and
randomly selecting an event to be generated for the target player from the candidate events for which the conditions are met using the weights, and generating the selected event as a new event for the target player.

* * * * *